United States Patent [19]

Honjo et al.

[11] Patent Number: 5,052,779
[45] Date of Patent: Oct. 1, 1991

[54] POLYMER CLAD OPTICAL FIBER

[75] Inventors: Makoto Honjo; Yasuo Matsuda; Toru Yamanishi, all of Yokohama, Japan

[73] Assignee: Sumitomo Electric Industries, Ltd., Osaka, Japan

[21] Appl. No.: 557,111

[22] Filed: Jul. 25, 1990

[30] Foreign Application Priority Data

Jul. 31, 1989 [JP] Japan ................................. 1-196686
Dec. 18, 1989 [JP] Japan ................................. 1-325831

[51] Int. Cl.$^5$ ............................................. G02B 6/16
[52] U.S. Cl. .................................... 385/145; 385/123
[58] Field of Search ................ 350/96.32, 96.33, 96.34

[56] References Cited

U.S. PATENT DOCUMENTS

| | | | |
|---|---|---|---|
| 4,552,431 | 11/1985 | Allemand et al. | 350/96.34 |
| 4,787,709 | 11/1988 | Kawada et al. | 350/96.34 |
| 4,798,445 | 1/1989 | Yamamoto et al. | 350/96.34 |
| 4,804,247 | 2/1989 | Kyoto et al. | 350/96.34 |
| 4,812,011 | 3/1989 | Tatsukami et al. | 350/96.34 |
| 4,844,604 | 7/1989 | Bishop et al. | 350/96.34 X |

OTHER PUBLICATIONS

Patent Abstracts of Japan, vol. 6, No. 225, p. 154, 10 Nov. 1982.
Patent Abstracts of Japan, vol. 6, No. 3 (C-086), 9 Jan. 1982.
Patent Abstracts of Japan, vol. 11, No. 353 (C-457), 18 Nov. 1987.
A New Heat Resistant Optical Fiber with Special Coating, S. Araki, T, et al, International Wire & Cable Symposium Proceedings 1988, pp. 745-750.
The Use of an Organosilsesquioxane for the Coating/Cladding of Silica Fibers, B. G. Bagley et al, Material Resh. Soc. vol. 88, Nagel, Sigel et al, in press.

Primary Examiner—John D. Lee
Assistant Examiner—Phan T. Heartney
Attorney, Agent, or Firm—Cushman, Darby & Cushman

[57] ABSTRACT

A polymer clad optical fiber comprising a core made of glass selected from the group consisting of quartz glass and optical glass, a cladding made of a cured material of a polymer composition comprising a ladder type polymethylsiloxane, a linear polymethylsiloxane having hydroxyl groups and optionally a solvent, and optionally a protecting layer made of a polymer material comprising a ladder type polysiloxane having phenyl side groups, which has low light transmission loss and increased mechanical strength.

10 Claims, 1 Drawing Sheet

FIGURE
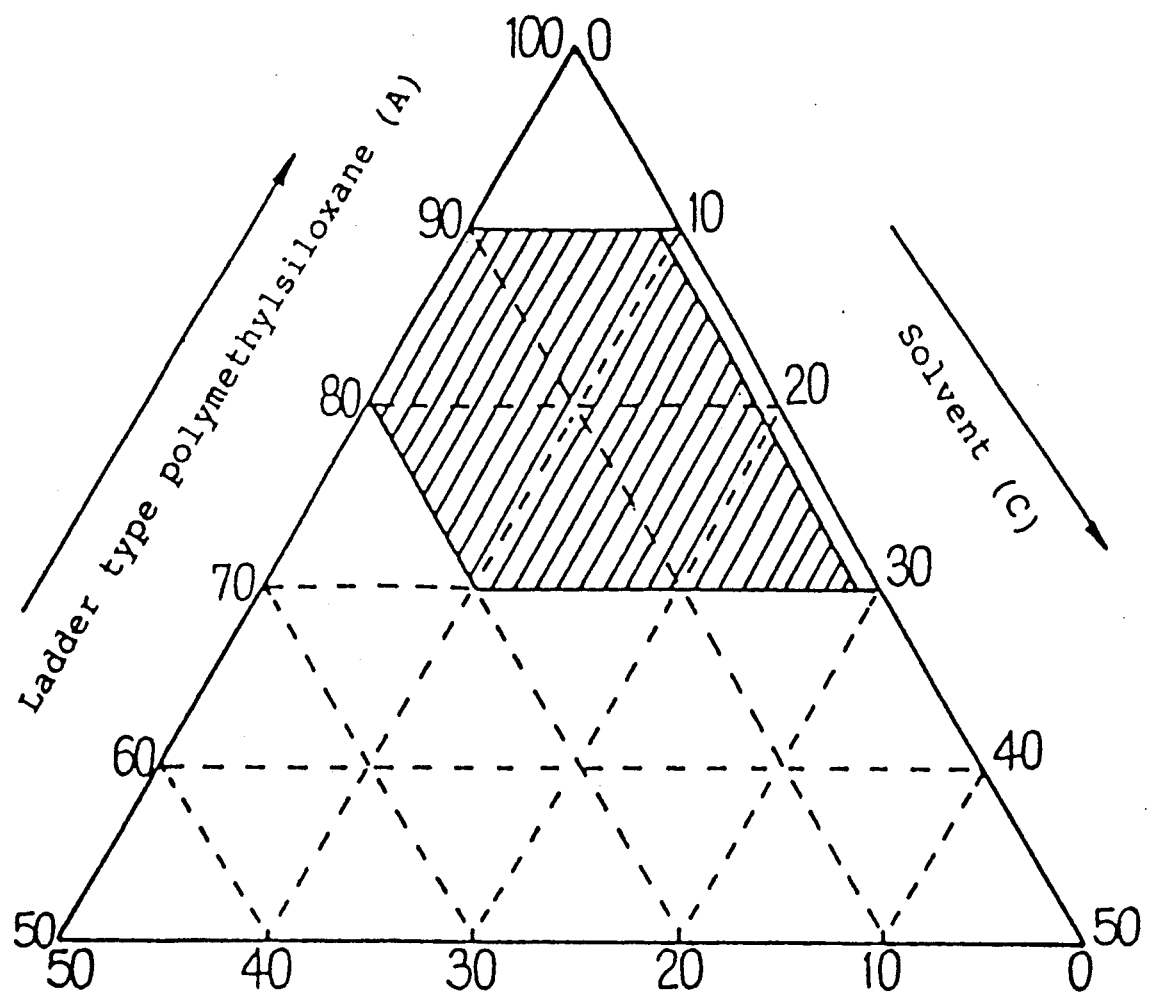

POLYMER CLAD OPTICAL FIBER

BACKGROUND OF THE INVENTION

1. Field of the Invention

The present invention relates to a polymer clad optical fiber comprising a core made of quartz glass or optical glass and a cladding made of a polymer. More particularly, the present invention relates to a polymer clad optical fiber comprising a cladding made of a ladder type polymethylsiloxane.

2. Description of the Related Art

As a cladding polymer of the conventional polymer clad optical fiber (hereinafter referred to as "PCF"), are used a silicone resin (cf. Japanese Patent Publication No. 2321/1981), a fluoroalkyl methacrylate polymer (cf. Japanese Patent Kokai Publication No. 12146/1983), a copolymer of vinylidene fluoride and tetrafluoroethylene (cf. Japanese Patent Publication No. 41966/1981), polyetheresteramide (cf. Japanese Patent Kokai Publication No. 60402/1981), and a UV light curable fluorinated acrylate composition (cf. U.S. Pat. No. 4,211,209).

These cladding polymers cannot satisfy high level requirements for the polymer clad optical fiber such as decrease of light transmission loss, easy fitting of a caulking type connector to the optical fiber, stability of temperature characteristics of light transmission loss and the like.

For example, since the silicone resin has poor mechanical characteristics, in particular, mechanical strength, the light transmission loss of a PCF comprising the silicone resin as the cladding polymer is increased when the caulking type connector is used.

Although the fluoroalkyl methacrylate polymer is highly transparent, its adhesivity to the core glass is insufficient.

Since the copolymer of vinylidene fluoride and tetrafluoroethylene and the polyetheresteramide have large scattering and absorption, they have inferior light transmission, and the light transmission loss of the optical fiber cannot be decreased.

Since the UV light curable fluorinated acrylate composition is cured with UV light irradiation after it is applied on the core glass, it is difficult to control the degree of curing, and residual stress caused by shrinkage of the polymer during curing increases the transmission loss of the optical fiber. In addition, adjustment of an outer diameter of the optical fiber is difficult.

As a cladding material which satisfies the above described requirements, a ladder type polysiloxane (organosilsesquioxane) is proposed (cf. U.S. Pat. No. 4,835,057).

However, a cured material of the ladder type polysiloxane has very small elongation. When it is coated on the glass core as the cladding material, its surface may be cracked because of the presence of bending strain, strain generated by difference of coefficients of thermal expansion between the core glass and the ladder type polysiloxane, or strain due to shrinkage of the ladder type polysiloxane during curing. Since the ladder type polysiloxane is in general dissolved or dispersed in a solvent, coated on the core glass and then cured by heating simultaneously with evaporation of the solvent, bubbles generated from the solvent may be trapped in the cured polysiloxane and increase the light transmission loss.

In addition, the ladder type polymethylsiloxane is degraded since the side methyl groups are cleaved and dissociated by oxidation in a high temperature atmosphere.

The above drawbacks of the ladder type polysiloxane are not overcome by the invention disclosed in U.S. Pat. No. 4,835,057.

SUMMARY OF THE INVENTION

One object of the present invention is to provide a polymer clad optical fiber which has low light transmission loss and increased mechanical strength.

Another object of the present invention is to provide a polymer clad optical fiber which comprises a cladding comprising a ladder type polysiloxane and has no or littler surface cracking, devitrification or deterioration of characteristics.

According to the present invention, there is provided a polymer clad optical fiber which comprises a core made of glass selected from the group consisting of quartz glass and optical glass and a cladding made of a cured material of a polymer composition comprising a ladder type polymethylsiloxane, a linear polymethylsiloxane having hydroxyl groups and optionally a solvent.

Further, the polymer clad optical fiber may comprise a protecting layer made of a polymer material comprising a ladder type polysiloxane having phenyl side groups.

DETAILED DESCRIPTION OF THE INVENTION

A typical ladder type polymethylsiloxane is a polysiloxane of the formula:

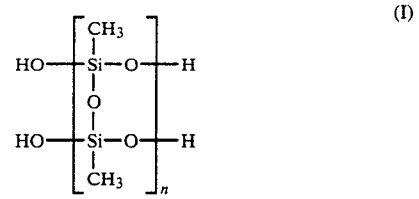

(I)

The ladder type polymethylsiloxane preferably has a number average molecular weight of 5000 to 100,000.

Since the ladder type polymethylsiloxane used in the present invention has a refractive index of 1.40 to 1.42, it is suitable as a cladding material of an optical fiber comprising a core made of quartz glass or optical glass which has a refractive index of about 1.45.

The ladder type polymethylsiloxane used in the present invention is a known polymer and may be prepared, for example, by a method disclosed in Japanese Patent Kokai Publication No. 88099/1978.

A typical linear polymethylsiloxane having the hydroxyl groups is a polysiloxane comprising repeating units of the formula:

(II)

in which the hydroxyl groups may be attached to the chain end(s) or the side group(s).

The linear polymethylsiloxane having the hydroxyl groups preferably has a number average molecular weight of about 500 to about 100,000, more preferably 1000 to 20,000.

The linear polymethylsiloxane has a refractive index of 1.40 to 1.44 and the cured material of the mixture of the linear polymethylsiloxane and the ladder type polymethylsiloxane has a refractive index of 1.41 to 1.43. Therefore, such cured material is suitable as the cladding material for the optical fiber comprising the core made of quartz glass or optical glass which has a refractive index of about 1.45.

A weight ratio of the ladder type polymethylsiloxane to the linear polymethylsiloxane is in general from 99:1 to 1:99, preferably from 95:5 to 5:95, more preferably 80:20 to 20:80. By adjusting the ratio of two polymethylsiloxanes, properties of the cladding such as hardness and heat resistance can be controlled. That is, when the content of the ladder type polymethylsiloxane is increased, the cured material has larger hardness and better heat resistance. When the content of the linear polymethylsiloxane is increased, the cured material has better elongation and flexibility.

As a solvent which may be used together with the polymethylsiloxanes, any solvent that has good compatibility with the polymethylsiloxanes can be used insofar as the solvent does not remain in the cured material after thermal curing of the polysiloxanes. Therefore, the solvent preferably has a low boiling point. However, when the solvent has too low boiling point, it may form bubbles in the cured material of the polysiloxanes. Preferably, the solvent has a boiling point of 70° to 200° C.

Specific examples of the solvent are alcohols (e.g. ethanol, n-propanol, isopropanol and n-butanol), ketones (e.g. methyl ethyl ketone and diethyl ketone), esters (e.g. ethyl acetate and n-butyl acetate), aromatic hydrocarbons (e.g. toluene and xylene), and the like.

When the solvent is used, a component composition of the polysiloxane composition is preferably in a hatched area in a ternary composition diagram of Figure in which the values are "% by weight". When the amount of the ladder type polymethylsiloxane is too large, the cured material has poor elongation and the cladding tends to be easily cracked. When the amount of the ladder type polymethylsiloxane is too small, the cured material is too soft so that the optical fiber is not suitable for fitting the caulking type connector. When the amount of the solvent is too large, the composition has too small viscosity.

The polysiloxane composition may contain other siloxane such as diorganopolysiloxane and alkoxyorganosilane in such amount that the functions of the ladder type poly-methylsiloxane are not deteriorated.

Further, the polysiloxane composition may contain a catalyst which catalyzes condensation and curing reactions, such as platinum base catalysts, Lewis acids, Lewis bases, zinc naphthenate, lead naphthenate and tetramethylammonium hydroxide.

In the present invention, the core glass fiber can be the same as that used in the conventional PCF. That is, the core glass fiber can be prepared by drawing the high purity quartz glass or the optical glass. A diameter of the core glass fiber is not critical and preferably from 0.05 to 0.5 mm.

For example, after drawing the quartz or optical glass, the polysiloxane composition is applied on the core glass fiber with a die and cured in a curing furnace to form a cladding layer. The curing conditions are selected according to the kinds and ratios of the polysiloxanes, the amount of the solvent and the like. For example, the polysiloxane composition is cured in an IR heating furnace of 1 to 3 meters in length at a curing temperature of 200° to 300° C.

A thickness of the cladding is not critical insofar as the produced optical fiber has sufficient performances. Preferably, the thickness of the cladding is from 10 to 30 μm.

The optical fiber of the present invention may have a protective layer around the cladding. The protective layer material may be a thermoplastic polymer such as polyethylene, polyamide, chlorinated polyethylene, polycarbonate, ethylene-tetrafluoroethylene (ETFE) copolymer and a perfluoroalkylvinylether (PFA).

In a preferred embodiment, the protective layer comprises a ladder type polysiloxane having phenyl side groups. Since the ladder type polysiloxane having the phenyl side groups has good heat resistance and blocks contact of oxygen with the cladding layer, it can prevent the degradation of the ladder type polymethyl siloxane in the cladding such as oxidation of the ladder type polymethylsiloxane or cleavage of the methyl groups, and liberation of the uncured materials or decomposed materials in the cladding layer. Therefore, the deterioration of the characteristics of the optical fiber due to the above degradation, or weight loss due to liberation of the materials can be prevented.

A typical ladder type polysiloxane having the phenyl side groups is a polysiloxane of the formula:

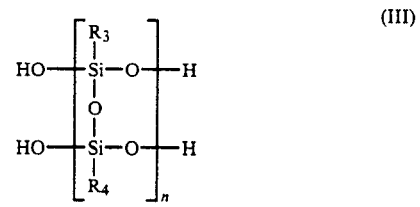

(III)

wherein $R_3$ and $R_4$ are independently a methyl group or a phenyl group, provided that at least one of them is a phenyl group.

The ladder type polysiloxane (III) preferably has a number average molecular weight of 5000 to 100,000.

The ladder type polysiloxane for the protective layer may be dissolved in a solvent to adjust the viscosity and then the solution is applied to the polymer clad optical fiber.

A thickness of the protective layer is not critical. Preferably, it is from 5 to 50 μm, preferably from 10 to 40 μm.

PREFERRED EMBODIMENTS OF THE INVENTION

The present invention will be illustrated by following Examples.

EXAMPLE 1

A flake-form ladder type polymethylsiloxane having a refractive index of 1.42 and a number average molecular weight of 6000 was dissolved in an oily linear dimethylsiloxane which had a refractive index of 1.41, a viscosity of 300 cps and a number average molecular weight of 10,000 and contained the —ROH (alcohol) groups wherein R is a $C_1$–$C_3$ alkyl group at both chain ends in a weight ratio of 1:1 to prepare a polysiloxane composition having a refractive index of 1.415 and a viscosity of 100,000 cps.

From a bar of anhydrous synthetic quartz, a core glass fiber having a diameter of 200 μm was drawn and simultaneously coated with the above polysiloxane composition through a die. Then, the coated glass fiber was passed through a baking oven at about 200° C. to thermally cure the polysiloxanes to produce a polymer clad optical fiber having an outer diameter of 230 μm.

A light transmission loss of the produced optical fiber of 1 km in length was measured at a wavelength of 810 nm. It was 7.5 dB/km.

The light transmission loss did not increase when the optical fiber was fitted with the caulking type connector, and the fitting strength of the optical fiber to the connector was 1.5 kg.

The adhesion of the cladding to the core glass fiber was good, and the optical fiber could be used at 200° C.

There was no bubble in the cladding layer.

Comparative Example 1

From a bar of anhydrous synthetic quartz, a core glass fiber having a diameter of 200 μm was drawn and simultaneously coated with a thermally curable silicone resin of linear polymethylsiloxane having a refractive index of 1.41 and a viscosity of 1000 cps through a die. Then, the coated glass fiber was passed through a baking oven at about 500° C. to thermally cure the polysiloxane to produce a polymer clad optical fiber having an outer diameter of 230 μm.

A light transmission loss of the produced optical fiber of 1 km in length was measured at a wavelength of 810 nm. It was 5.6 dB/km.

When the optical fibers were connected with the caulking type connectors, the transmission loss increased by about 2 dB/km per one connector. When the caulking strength was decreased to reduce the transmission loss, the fitting strength of the optical fiber to the connector was decreased to less than 0.1 kg, and the connected optical fibers could not be practically used.

EXAMPLE 2

A flake-form ladder type polymethylsiloxane having a refractive index of 1.42 and a number average molecular weight of 6000 was dissolved in an oily linear dimethylsiloxane which had a refractive index of 1.41, a viscosity of 300 cps and a number average molecular weight of 10,000 and contained the —ROH groups at a part of chain ends (the OH content of 2.1 %) and n-butanol in a weight ratio of 9:1:2 to prepare a polysiloxane composition having a refractive index of 1.42 and a viscosity of 6000 cps.

From a bar of anhydrous synthetic quartz, a core glass fiber having a diameter of 200 μm was drawn and simultaneously coated with the above polysiloxane composition through a die. Then, the coated glass fiber was passed through a baking oven at about 250° C. to thermally cure the polysiloxanes to produce a polymer clad optical fiber having an outer diameter of 230 μm.

A light transmission loss of the produced optical fiber of 1 km in length was measured at a wavelength of 850 nm. It was 7.5 dB/km.

The cladding layer had no cracking.

The light transmission loss did not increase when the optical fiber was fitted with the caulking type connector, and the fitting strength of the optical fiber to the connector was 1.5 kg.

Tensile strength was measured with a distance of 300 mm at a pulling rate of 100 mm/min. It was 14 to 15 kg.

The adhesion of the cladding to the core glass fiber was good, and the optical fiber could be used at 200° C.

Comparative Example 2

The same flake-form ladder type polymethylsiloxane as used in Example 2 was dissolved in n-butanol in a weight ratio of 75:25 to prepare a polysiloxane composition having a viscosity of 3000 cps.

From a bar of anhydrous synthetic quartz, a core glass fiber having a diameter of 200 μm was drawn and simultaneously coated with the above polysiloxane composition with a die. Then, the coated glass fiber was passed through a baking oven at about 250° C. to thermally cure the polysiloxane to produce a polymer clad optical fiber having an outer diameter of 230 μm.

A light transmission loss of the produced optical fiber of 1 km in length was measured at a wavelength of 850 nm. It was 200 dB/km.

When the cladding layer was observed with a microscope to find that cracks were formed partly.

The tensile strength was from 3 to 15 kg.

EXAMPLE 3

A flake-form ladder type polymethylsiloxane having a refractive index of 1.42 and a number average molecular weight of 6000 was dissolved in an oily linear dimethylsiloxane which had a refractive index of 1.44, a viscosity of 200 cps and a number average molecular weight of 10,000 and contained the —ROH groups at both chain ends and ethyl acetate in a weight ratio of 8:2:2. To the solution, lead naphthenate in an amount of 1 % by weight based on the weight of the ladder type polymethylsiloxane to prepare a polysiloxane composition having a refractive index of 1.42 and a viscosity of 5000 cps.

With this polysiloxane composition, a polymer clad optical fiber was produced in the same manner as in Example 2. The properties of the produced optical fiber were substantially the same as those of Example 2.

EXAMPLE 4

A flake-form ladder type polymethylsiloxane having a refractive index of 1.42 and a number average molecular weight of 6000 was dissolved in an oily linear dimethylsiloxane which had a refractive index of 1.43, a viscosity of 300 cps and a number average molecular weight of 10,000 and contained the —ROH groups at a part of chain ends (the OH content of 2.1 %) and n-butanol in a weight ratio of 9:1:2 to prepare a polysiloxane composition for cladding having a refractive index of 1.42 and a viscosity of 6,000 cps.

A flake-form ladder type polyphenylsiloxane of the formula (III) in which both $R_3$ and $R_4$ are phenyl having a refractive index of 1.56 and a number average molecular weight of 6000 was dissolved in n-butanol in a weight ratio of 75:25 to prepare a coating composition having a viscosity of 2000 cps.

From a bar of anhydrous synthetic quartz, a core glass fiber having a diameter of 200 μm was drawn and simultaneously coated with the above polysiloxane composition through a die. Then, the coated glass fiber was passed through a baking oven at about 250° C. to thermally cure the polysiloxanes to produce a polymer clad optical fiber having an outer diameter of 230 μm.

Thereafter, the coating composition was coated around the cladding layer through a die and thermally cured in by passing the coated polymer clad optical fiber through a baking oven at about 250° C. to obtain a coated optical fiber consisting of a core glass fiber, a cladding layer and a protective layer having an outer diameter of 250 μm.

A light transmission loss of the produced optical fiber of 1 km in length was measured at a wavelength of 850 nm. It was 7.5 dB/km.

No cracking was observed.

The light transmission loss did not increase when the optical fiber was fitted with the caulking type connector, and the fitting strength of the optical fiber to the connector was 1.5 kg.

Tensile strength was measured with a standard distance of 300 mm at a pulling rate of 100 mm/min. It was 14 to 15 kg.

When the optical fiber was kept standing at 250° C. for 3 days, no crack was observed and no increase of the transmission loss was measured.

EXAMPLE 5

A flake-form ladder type polysiloxane containing phenyl groups and methyl groups in a molar ratio of 1:2 and having a refractive index of 1.50 and a number average molecular weight of 6000 was dissolved in butanol in a weight ratio of 75:25 to prepare a coating composition having a viscosity of 2000.

Around the same optical fiber comprising the polysiloxane cladding as that in Example 4, the above coating composition was coated and cured by passing the coated fiber through the baking oven at about 250° C. to obtain a polymer clad optical fiber having an outer diameter of 250 μm.

A light transmission loss of the produced optical fiber of 1 km in length was measured at a wavelength of 850 nm. It was 7.5 dB/km.

No cracking was observed on the coating surface.

The light transmission loss did not increase when the optical fiber was fitted with the caulking type connector, and the fitting strength of the optical fiber to the connector was 1.5 kg.

Tensile strength was measured with a standard distance of 300 mm at a pulling rate of 100 mm/min. It was 14 to 15 kg.

When the optical fiber was kept standing at 250° C. for 3 days, no crack was observed and no increase of the transmission loss was measured.

What is claimed is:

1. A polymer clad optical fiber which comprises a core made of glass selected from the group consisting of quartz glass and optical glass and a cladding made of a cured material of a polymer composition comprising a ladder type polymethylsiloxane and a linear polymethylsiloxane having hydroxyl groups.

2. The polymer clad optical fiber according to claim 1, wherein said ladder type polymethylsiloxane is a polysiloxane of the formula:

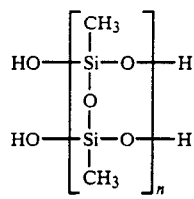

3. The polymer clad optical fiber according to claim 1, wherein said ladder type polymethylsiloxane has a number average molecular weight of 5000 to 100,000.

4. The polymer clad optical fiber according to claim 1, wherein said linear polymethylsiloxane having the hydroxyl groups is a polysiloxane comprising repeating units of the formula:

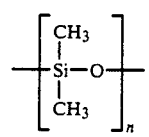

in which the hydroxyl groups may be attached to the chain end(s) or the side group(s).

5. The polymer clad optical fiber according to claim 1, wherein said linear polymethylsiloxane having the hydroxyl groups has a number average molecular weight of 500 to 100,000.

6. The polymer clad optical fiber according to claim 1, wherein a weight ratio of the ladder type polymethylsiloxane to the linear polymethylsiloxane is from 99:1 to 1:99.

7. The polymer clad optical fiber according to claim 1, wherein said polymer composition for the cladding further contains a solvent.

8. The polymer clad optical fiber according to claim 1, which further comprises a protecting layer made of a polymer material comprising a ladder type polysiloxane having phenyl side groups.

9. The polymer clad optical fiber according to claim 8, wherein said ladder type polysiloxane having the phenyl side groups is a polysiloxane of the formula:

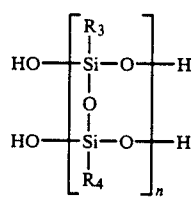

wherein $R_3$ and $R_4$ are independently a methyl group or a phenyl group, provided that at least one of them is a phenyl group.

10. The polymer clad optical fiber according to claim 8, wherein said ladder type polysiloxane having the phenyl side groups has a number average molecular weight of 5000 to 100,000.

* * * * *

UNITED STATES PATENT AND TRADEMARK OFFICE
CERTIFICATE OF CORRECTION

PATENT NO. : 5,052,779

DATED : October 1, 1991

INVENTOR(S) : Makoto Honjo et al

It is certified that error appears in the above-identified patent and that said Letters Patent is hereby corrected as shown below:

ON THE TITLE PAGE:

Please add the following to item [30]:

(30) Foreign Application Priority Data

--Mar. 13, 1990 (JP) Japan......... 2-59983--

Signed and Sealed this

Twenty-fifth Day of May, 1993

Attest:

MICHAEL K. KIRK

Attesting Officer

Acting Commissioner of Patents and Trademarks